(12) United States Patent
Knox

(10) Patent No.: US 9,914,410 B1
(45) Date of Patent: Mar. 13, 2018

(54) LICENSE PLATE COVERING ASSEMBLY

(71) Applicant: Andrew Knox, London (CA)

(72) Inventor: Andrew Knox, London (CA)

( * ) Notice: Subject to any disclaimer, the term of this patent is extended or adjusted under 35 U.S.C. 154(b) by 0 days.

(21) Appl. No.: 15/260,989

(22) Filed: Sep. 9, 2016

(51) Int. Cl.
*B60R 11/00* (2006.01)
*G09F 21/04* (2006.01)
*B60R 13/10* (2006.01)

(52) U.S. Cl.
CPC .................................. *B60R 13/105* (2013.01)

(58) Field of Classification Search
CPC .......... G09F 21/04; G09F 7/18; B60R 13/105
USPC .................................................... 40/202, 209
See application file for complete search history.

(56) References Cited

U.S. PATENT DOCUMENTS

| | | | | |
|---|---|---|---|---|
| 2,710,475 A * | 6/1955 | Salzmann | ............. | B60R 13/105 40/202 |
| 4,891,895 A | 1/1990 | DeLaquil, Jr. | | |
| 5,058,926 A * | 10/1991 | Drower | ................... | B32B 27/08 283/107 |
| 5,149,571 A | 9/1992 | Croell | | |
| 5,161,827 A * | 11/1992 | Grosso | .................... | G09F 3/203 283/109 |
| 5,294,279 A * | 3/1994 | Kuhns | ...................... | B32B 3/04 156/226 |
| 5,634,670 A * | 6/1997 | Orensteen | ................. | G09F 3/20 283/101 |
| 5,819,449 A * | 10/1998 | Molson | ................... | B60R 13/10 40/200 |
| D623,105 S | 9/2010 | Aneiros | | |
| 7,836,618 B1 * | 11/2010 | Parenti | ................... | B60R 13/105 40/201 |
| 7,866,071 B1 * | 1/2011 | Downey | ................. | B60R 11/00 109/50 |
| 8,533,982 B2 * | 9/2013 | Rousey | .................... | G09F 21/04 40/200 |
| 2008/0098629 A1 * | 5/2008 | Graham | .................. | B60R 13/10 40/201 |
| 2008/0229634 A1 * | 9/2008 | Collins | ................. | B60R 13/105 40/209 |
| 2011/0283574 A1 | 11/2011 | Ellman et al. | | |
| 2012/0096748 A1 * | 4/2012 | Volpe | .................... | B60R 13/105 40/209 |
| 2013/0097900 A1 * | 4/2013 | Rousey | ................. | B60R 13/105 40/209 |
| 2015/0075042 A1 * | 3/2015 | Ebensteiner | ........... | B60Q 1/268 40/204 |

FOREIGN PATENT DOCUMENTS

WO    WO2006076320    7/2006

\* cited by examiner

*Primary Examiner* — Shin Kim

(57) ABSTRACT

A license plate covering assembly includes a frame that may be coupled to a vehicle. The frame may surround a license plate on the vehicle. The frame comprising a first half that is hingedly coupled to a second half. A window is coupled to the second half. The window facilitates the license plate to be visible when the frame is positioned in a closed position.

11 Claims, 5 Drawing Sheets

LICENSE PLATE COVERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to covering devices and more particularly pertains to a new covering device for inhibiting a license plate from impact damage.

BRIEF SUMMARY OF THE INVENTION

An embodiment of the disclosure meets the needs presented above by generally comprising a frame that may be coupled to a vehicle. The frame may surround a license plate on the vehicle. The frame comprising a first half that is hingedly coupled to a second half. A window is coupled to the second half. The window facilitates the license plate to be visible when the frame is positioned in a closed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
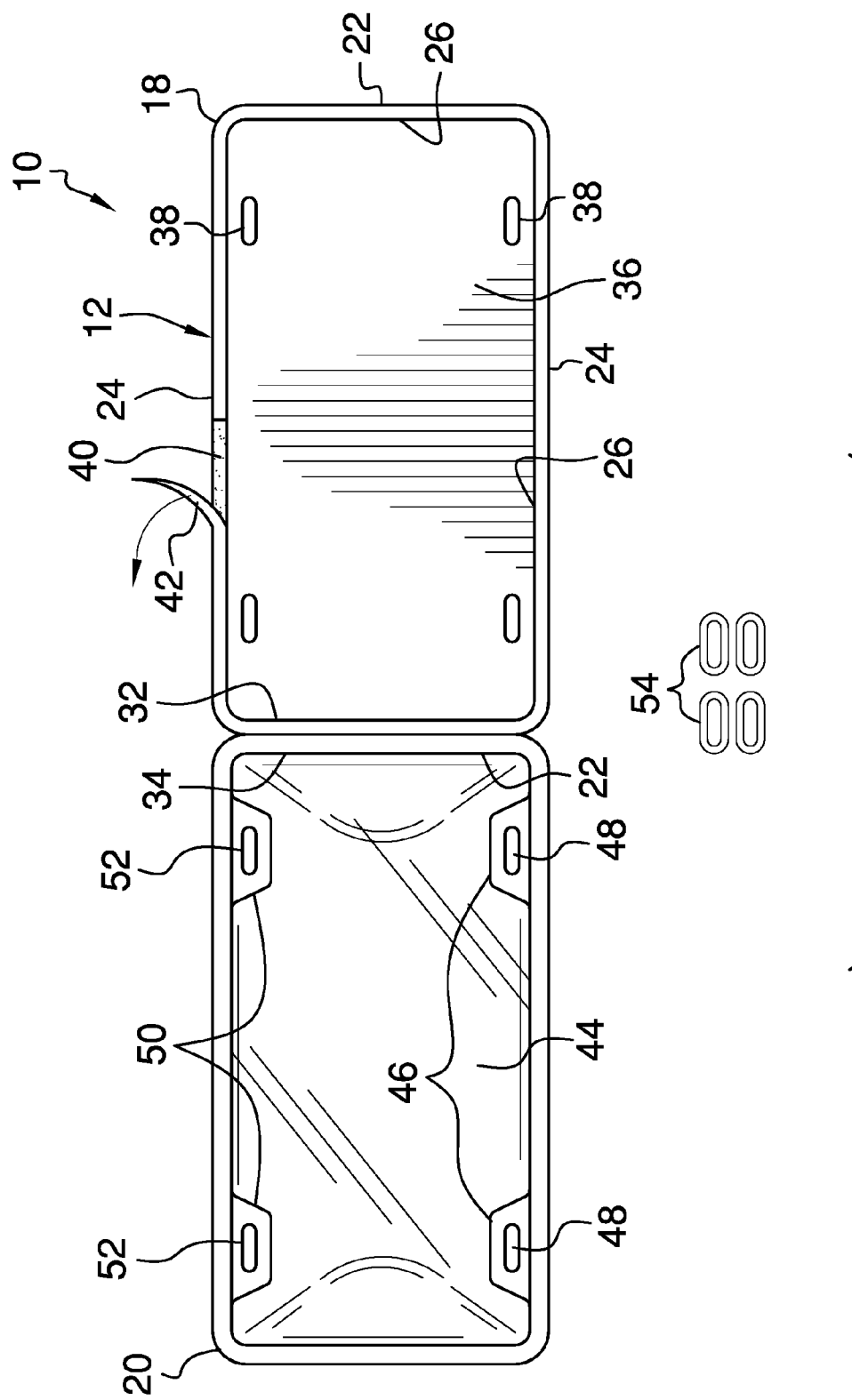
FIG. 1 is a front view of a license plate covering assembly according to an embodiment of the disclosure.
Figure 2:
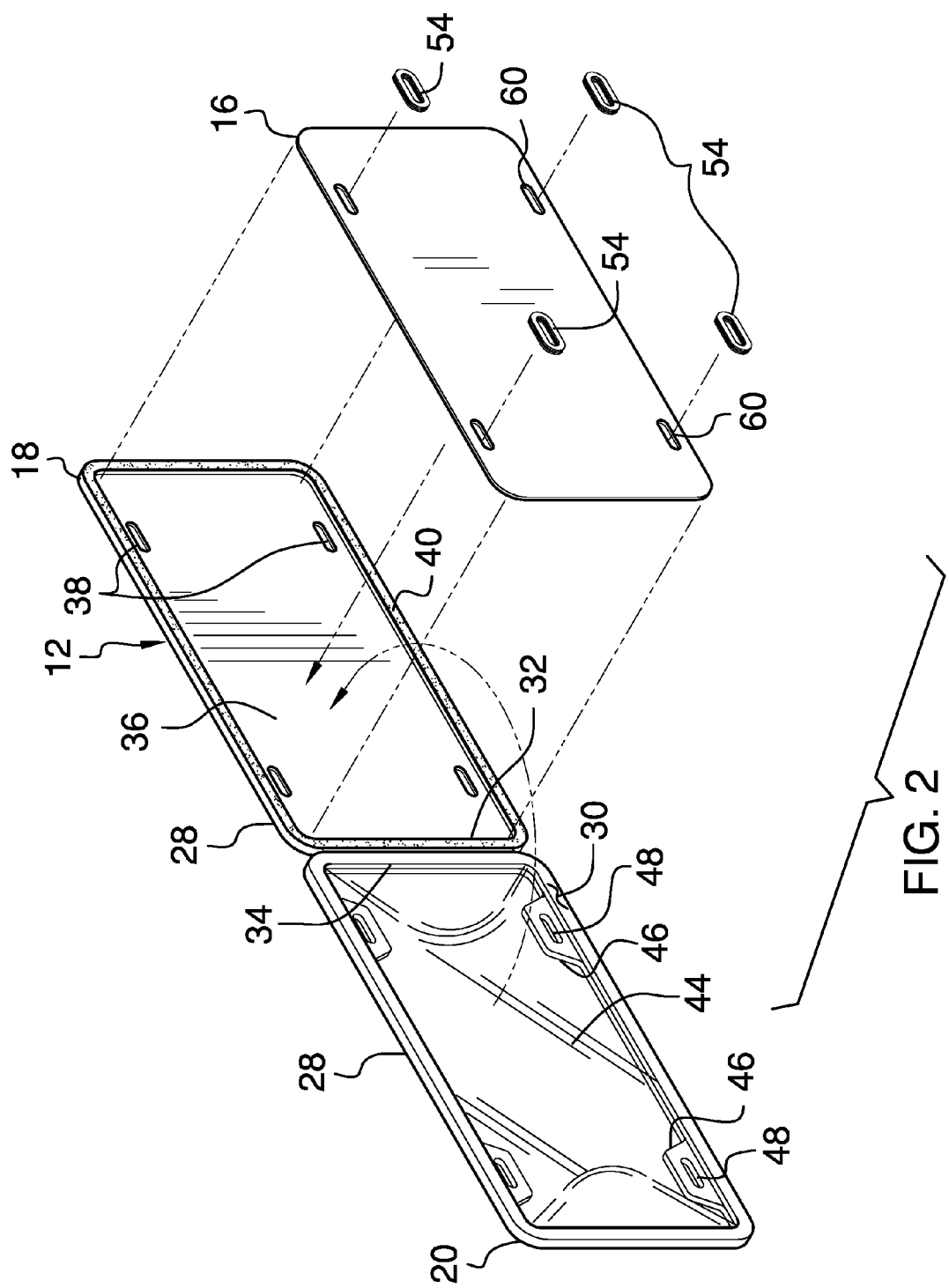
FIG. 2 is an exploded perspective view of an embodiment of the disclosure.
Figure 3:
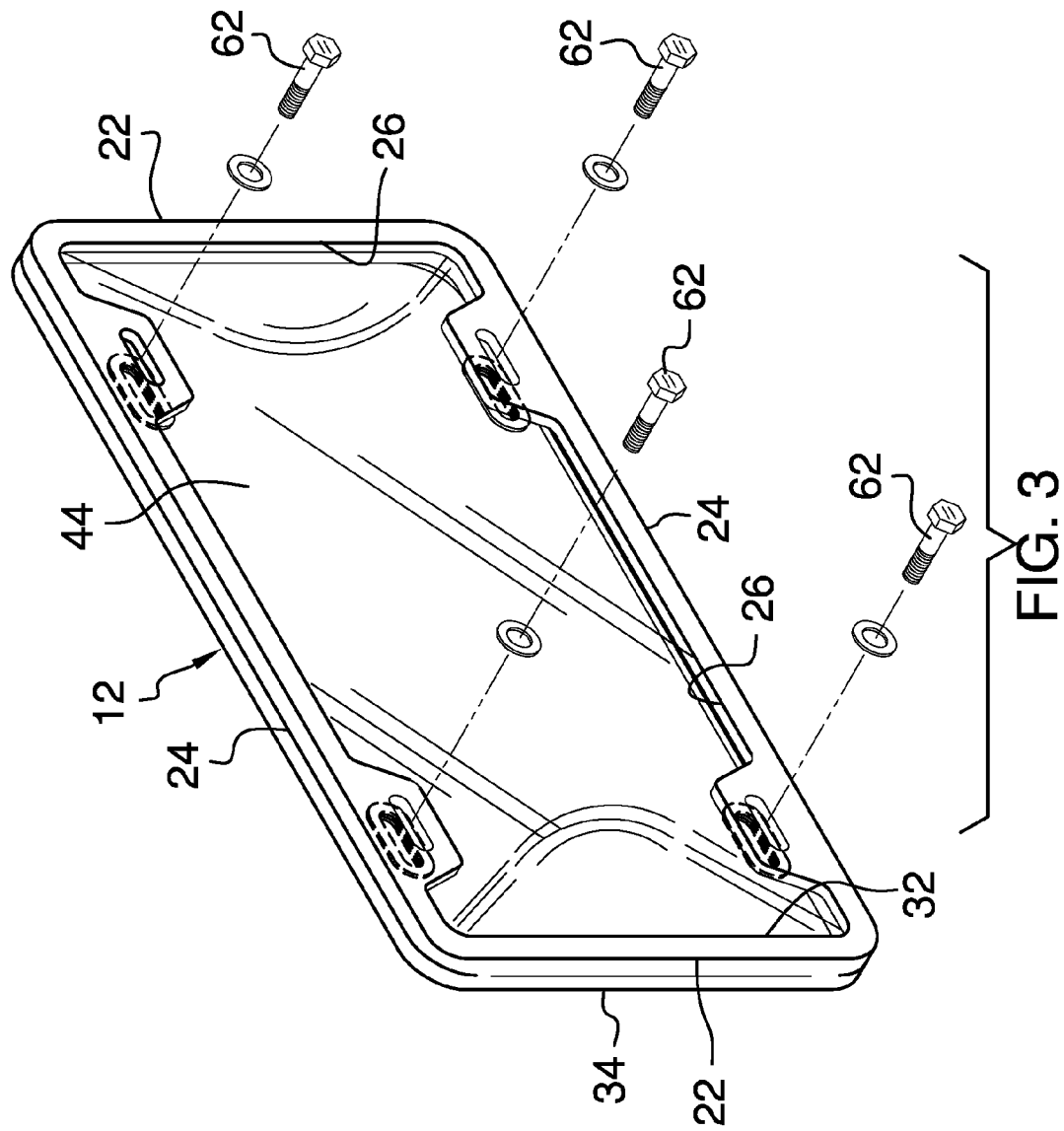
FIG. 3 is a front perspective view of an embodiment of the disclosure.
Figure 4:
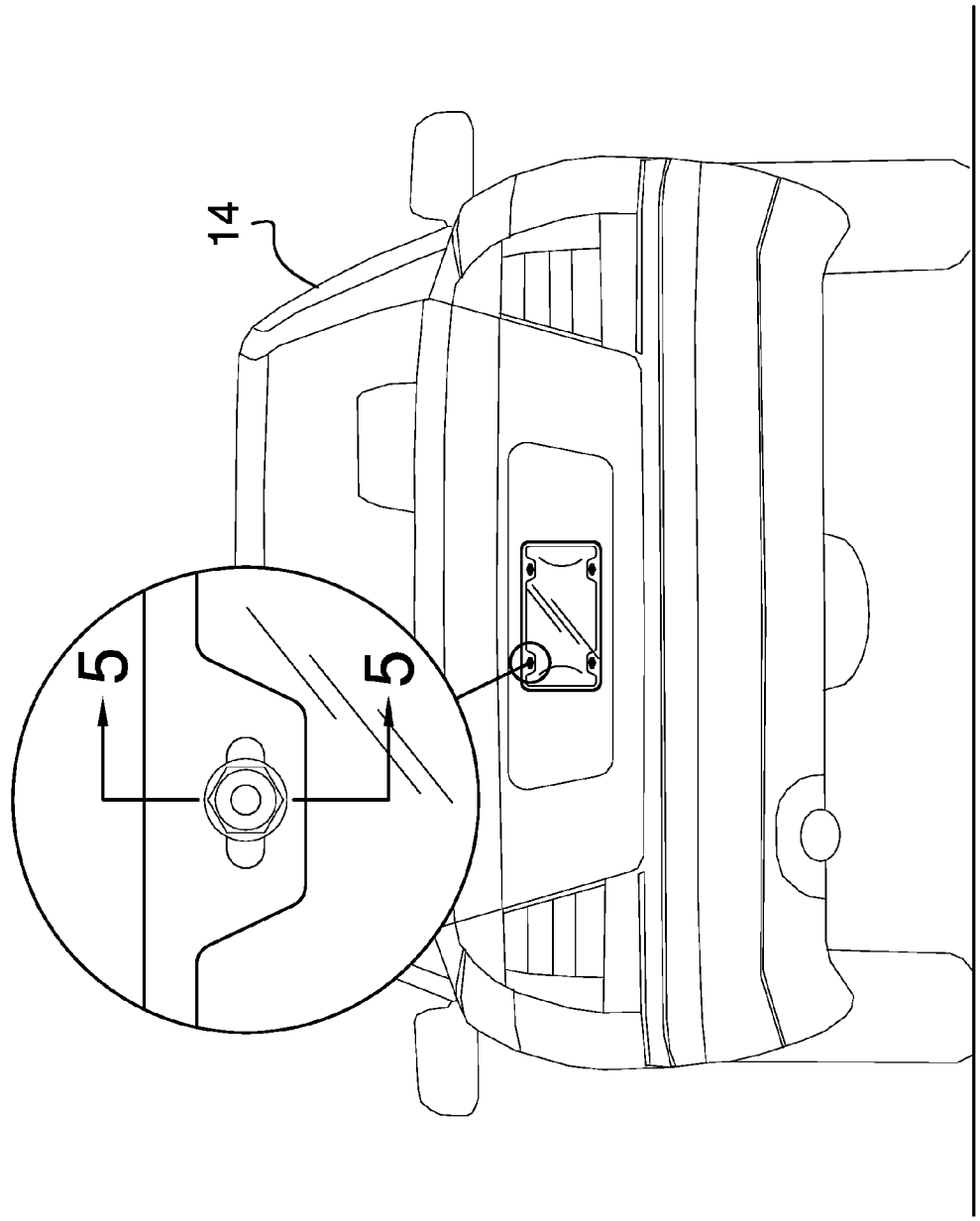
FIG. 4 is a perspective in-use view of an embodiment of the disclosure.
Figure 5:
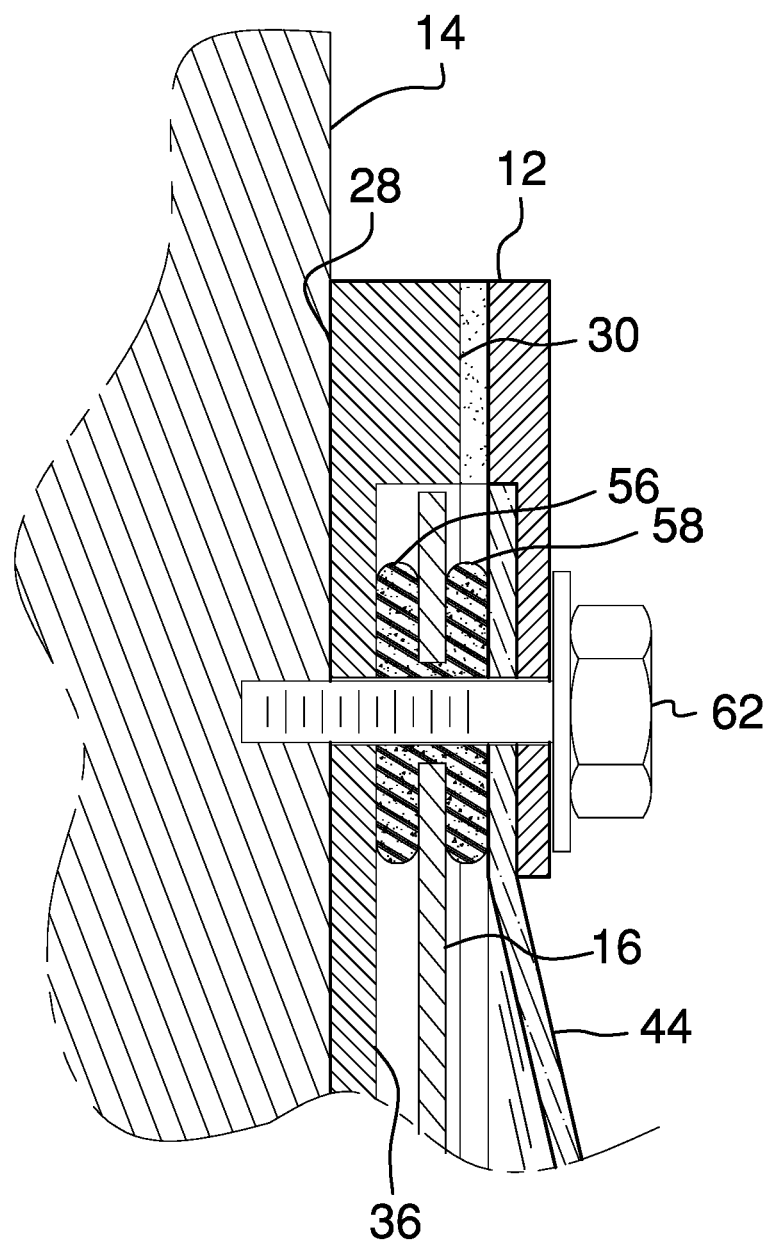
FIG. 5 is a cross sectional view taken along line 5-5 of FIG. 4 of an embodiment of the disclosure.

With reference now to the drawings, and in particular to FIGS. 1 through 5 thereof, a new covering device embodying the principles and concepts of an embodiment of the disclosure and generally designated by the reference numeral 10 will be described.

As best illustrated in FIGS. 1 through 5, the license plate covering assembly 10 generally comprises a frame 12 that may be coupled to a vehicle 14. The frame 12 may surround a license plate 16 on the vehicle 14. The vehicle 14 may be a passenger vehicle 14 or the like. The frame 12 comprises a first half 18 that is hingedly coupled to a second half 20. Thus, the frame 12 may be closed around the license plate 16.

Each of the first half 18 and the second half 20 comprises a pair of first members 22 each extending between a pair of second members 24. The second members 24 are spaced apart from each other. Thus, each of the first half 18 and the second half 20 forms a rectangle. Each of first members 22 and each of the second members 24 corresponding to each of the first half 18 and the second half 20 has an inwardly facing edge 26.

Each of the first members 22 and the second members 24 corresponding to the first half 18 has a first surface 28 and a second surface 30. The first surface 28 corresponding to the first half 18 may be coupled to the vehicle 14. The pair of first members 22 includes a primary first member 32 and a second first member 34. The primary first member 32 corresponding to the first half 18 is hingedly coupled to the second first member 34 corresponding to the second half 20.

The first half 18 comprises a plate 36 that is coupled to the inwardly facing edge 26 corresponding to each of the first members 22 and the second members 24. The plate 36 has a plurality of slots 38 extending therethrough. Each of the slots 38 is positioned adjacent to an associated one of four corners of the plate 36. The first half 18 may receive the license plate 16 has the license plate 16 abutting the plate 36.

An adhesive layer 40 is provided. The adhesive layer 40 is coupled to the second surface 30 corresponding to each of the first members 22 and the second members 24. A protective layer 42 is removably coupled to the adhesive layer 40. The protective layer 42 is selectively removed from the adhesive layer 40.

The second half 20 includes a window 44. The window 44 is coupled to the inwardly facing edge 26 corresponding to each of the first members 22 and the second members 24. The window 44 is comprised of a translucent material. Moreover, the window 44 is convexly arcuate with respect to the first surface 28. The window 44 is comprised of a shatter resistant material. Thus, the window 44 protects the license plate 16 from impact damage. The window 44 facilitates the license plate 16 to be visible when the frame 12 is positioned in the closed position.

The adhesive layer 40 adhesively engages the second surface 30 corresponding to the second half 20 when the frame 12 is positioned in a closed position. Thus, the frame 12 is retained in the closed position. Moreover, the adhesive layer 40 forms a fluid impermeable seal with the second half 20. Thus, the adhesive layer 40 inhibits fluid from entering the frame 12 when the frame 12 is in the closed position.

A pair of first tabs 46 is provided. Each of the first tabs 46 is coupled to the inwardly facing edge 26 corresponding to an associated one of the first members 22. The first tabs 46 are spaced apart from each other. Each of the first tabs 46 has a first slot 48 extending therethrough. The first slot 48 in each of the first tabs 46 is aligned with an associated one of the slots 38 in the plate 36 when the frame 12 is positioned in the closed position.

A pair of second tabs 50 is provided. Each of the second tabs 50 is coupled to the inwardly facing edge 26 corresponding to an associated one of the first members 22. The second tabs 50 are spaced apart from each other. Each of the second tabs 50 is directed toward an associated one of the first tabs 46. Each of the second tabs 50 has a second slot 52 extending therethrough. The second slot 52 in each of the second tabs 50 is aligned with an associated one of the slots 38 in the plate 36 when the frame 12 is positioned in the closed position.

A plurality of grommets 54 is provided. Each of the grommets 54 has a first portion 56 that is spaced from a second portion 58. Each of the grommets 54 may be positioned in an associated one of a plurality of bolts holes 60 in the license plate 16. The first portion 56 corresponding to each of the grommets 54 abuts the plate 36 when the frame 12 is positioned in the closed position. The second portion 58 corresponding to each of the grommets 54 abuts the window 44 when the frame 12 is positioned in the closed position. Each of the grommets 54 is comprised of a resiliently compressible material.

A plurality of bolts 62 may be provided. Each of the bolts 62 may be extended through an associated one of the second slots 52, an associated one of the grommets 54 and an associated one of the first slots 48. Each of the bolts engages the vehicle 14. Thus, the frame 12 and the license plate 16 are retained on the vehicle 14.

In use, each of the grommets 54 is positioned in the associated bolt hole 60 in the license plate 16. The license plate 16 is positioned in the first half 18 of the frame 12. The protective layer 42 is removed from the adhesive layer 40. The frame 12 is positioned in the closed position and the adhesive layer 40 retains the frame 12 in the closed position. Each of the bolts is extended through the frame 12 and engages the vehicle 14. Thus, the frame 12 and the license plate 16 are retained on the vehicle 14. The window 44 inhibits the license plate 16 from impact damage thereby extending a service life of the license plate 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A license plate covering assembly being configured to inhibit the license plate from becoming damaged, said assembly comprising:
    a frame being configured to be coupled to a vehicle, said frame being configured to surround a license plate on the vehicle, said frame comprising a first half being hingedly coupled to a second half;
    a window being coupled to said second half wherein said window is configured to facilitate the license plate to be visible when said frame is positioned in a closed position;
    a plate;
    a window; and
    a plurality of grommets, each of said grommets having a first portion being spaced from a second portion, each of said grommets being configured to be positioned in an associated one of a plurality of bolts holes in the license plate, said first portion corresponding to each of said grommets abutting said plate when said frame is positioned in said closed position, said second portion corresponding to each of said grommets abutting said window when said frame is positioned in said closed position.

2. The assembly according to claim 1, wherein each of said first half and said second half comprises a pair of first members each extending between a pair of second members, said second members being spaced apart from each other such that each of said first half and said second half forms a rectangle, each of first members and each of said second members corresponding to each of said first half and said second half having an inwardly facing edge, each of said first members and said second members corresponding to said first half having a first surface and a second surface, said first surface corresponding to said first half being configured to be coupled to the vehicle.

3. The assembly according to claim 2, wherein said pair of first members includes a primary first member and a secondary first member, said primary first member corresponding to said first half being hingedly coupled to said secondary first member corresponding to said second half.

4. The assembly according to claim 2, wherein said first half comprises a plate being coupled to said inwardly facing edge corresponding to each of said first members and said second members, said plate having a plurality of slots extending therethrough, each of said slots being positioned adjacent to an associated one of four corners of said plate, said first half being configured to receive the license plate having the license plate abutting said plate.

5. A license plate covering assembly being configured to inhibit the license plate from becoming damaged, said assembly comprising:
    a frame being configured to be coupled to a vehicle, said frame being configured to surround a license plate on the vehicle, said frame comprising a first half being hingedly coupled to a second half, each of said first half and said second half comprising a pair of first members each extending between a pair of second members, said second members being spaced apart from each other such that each of said first half and said second half forms a rectangle, each of first members and each of said second members corresponding to each of said first half and said second half having an inwardly facing edge, each of said first members and said second members corresponding to said first half having a first surface and a second surface, said first surface corresponding to said first half being configured to be coupled to the vehicle;

a window being coupled to said second half wherein said window is configured to facilitate the license plate to be visible when said frame is positioned in a closed position;

an adhesive layer being coupled to said second surface corresponding to each of said first members and said second members.

6. The assembly according to claim 5, further comprising a protective layer being removably coupled to said adhesive layer, said protective layer being selectively removed from said adhesive layer.

7. The assembly according to claim 2, wherein said window is coupled to said inwardly facing edge corresponding to each of said first members and said second members corresponding to said second half.

8. A license plate covering assembly being configured to inhibit the license plate from becoming damaged, said assembly comprising:

a frame being configured to be coupled to a vehicle, said frame being configured to surround a license plate on the vehicle, said frame comprising a first half being hingedly coupled to a second half, each of said first half and said second half comprising a pair of first members each extending between a pair of second members, said second members being spaced apart from each other such that each of said first half and said second half forms a rectangle, each of first members and each of said second members corresponding to each of said first half and said second half having an inwardly facing edge, each of said first members and said second members corresponding to said first half having a first surface and a second surface, said first surface corresponding to said first half being configured to be coupled to the vehicle;

a window being coupled to said second half wherein said window is configured to facilitate the license plate to be visible when said frame is positioned in a closed position, said window being coupled to said inwardly facing edge corresponding to each of said first members and said second members corresponding to said second half;

said first half includes an adhesive layer; and said window is convexly arcuate with respect to said first surface corresponding to said second half, said adhesive layer adhesively engaging said second surface corresponding to said second half when said frame is positioned in said closed position such that said frame is retained in said closed position.

9. A license plate covering assembly being configured to inhibit the license plate from becoming damaged, said assembly comprising:

a frame being configured to be coupled to a vehicle, said frame being configured to surround a license plate on the vehicle, said frame comprising a first half being hingedly coupled to a second half, each of said first half and said second half comprising a pair of first members each extending between a pair of second members, said second members being spaced apart from each other such that each of said first half and said second half forms a rectangle, each of first members and each of said second members corresponding to each of said first half and said second half having an inwardly facing edge, each of said first members and said second members corresponding to said first half having a first surface and a second surface, said first surface corresponding to said first half being configured to be coupled to the vehicle;

a window being coupled to said second half wherein said window is configured to facilitate the license plate to be visible when said frame is positioned in a closed position;

a plate having a plurality of slots; and a pair of first tabs, each of said first tabs being coupled to said inwardly facing edge corresponding to an associated one of said first members of said second half, said first tabs being spaced apart from each other, each of said first tabs having a first slot extending therethrough, said first slot in each of said first tabs being aligned with an associated one of said slots in said plate when said frame is positioned in said closed position.

10. The assembly according to claim 9, further comprising a pair of second tabs, each of said second tabs being coupled to said inwardly facing edge corresponding to an associated one of said first members of said second half, said second tabs being spaced apart from each other and being directed toward and associated one of said first tabs, each of said second tabs having a second slot extending therethrough, said second slot in each of said second tabs being aligned with an associated one of said slots in said plate when said frame is positioned in said closed position.

11. A license plate covering assembly being configured to inhibit the license plate from becoming damaged, said assembly comprising:

a frame being configured to be coupled to a vehicle, said frame being configured to surround a license plate on the vehicle, said frame comprising a first half being hingedly coupled to a second half, each of said first half and said second half comprising a pair of first members each extending between a pair of second members, said second members being spaced apart from each other such that each of said first half and said second half forms a rectangle, each of first members and each of said second members corresponding to each of said first half and said second half having an inwardly facing edge, each of said first members and said second members corresponding to said first half having a first surface and a second surface, said first surface corresponding to said first half being configured to be coupled to the vehicle, said pair of first members including a primary first member and a secondary first member, said primary first member corresponding to said first half being hingedly coupled to said secondary first member corresponding to said second half;

said first half comprising:

a plate being coupled to said inwardly facing edge corresponding to each of said first members and said second members, said plate having a plurality of slots extending therethrough, each of said slots being positioned adjacent to an associated one of four corners of said plate, said first half being configured to receive the license plate having the license plate abutting said plate, an adhesive layer being coupled to said second surface corresponding to each of said first members and said second members, and a protective layer being removably coupled to said adhesive layer, said protective layer being selectively removed from said adhesive layer; and said second half comprising:

a window being coupled to said inwardly facing edge corresponding to each of said first members and said second members, said window being convexly arcuate with respect to said first surface, said adhesive layer adhesively engaging said second surface corresponding to said second half when said frame is positioned in a closed position such that said frame is retained in said closed position wherein said window is configured to facilitate the license plate to be visible when said frame is positioned in said closed position, a pair of first tabs, each of said first tabs being coupled to said inwardly facing edge corresponding to an associated one of said first members, said first tabs being spaced apart from each other, each of said first tabs having a first slot extending therethrough, said first slot in each of said first tabs being aligned with an associated one of said slots in said plate when said frame is positioned in said closed position, and a pair of second tabs, each of said second tabs being coupled to said inwardly facing edge corresponding to an associated one of said first members, said second tabs being spaced apart from each other and being directed toward and associated one of said first tabs, each of said second tabs having a second slot extending therethrough, said second slot in each of said second tabs being aligned with an associated one of said slots in said plate when said frame is positioned in said closed position; and a plurality of grommets, each of said grommets having a first portion being spaced from a second portion, each of said grommets being configured to be positioned in an associated one of a plurality of bolts holes in the license plate, said first portion corresponding to each of said grommets abutting said plate when said frame is positioned in said closed position, said second portion corresponding to each of said grommets abutting said window when said frame is positioned in said closed position.

* * * * *